United States Patent [19]
Paulsen

[11] Patent Number: 5,664,194
[45] Date of Patent: Sep. 2, 1997

[54] METHOD FOR AUTONOMOUSLY TRANSFERRING CODE TO A COMPUTER WITHOUT ACCESSING LOCAL MEMORY BY THE CENTRAL PROCESSING UNIT

[75] Inventor: David L. Paulsen, Mountain View, Calif.

[73] Assignee: Metricom, Inc., Los Gatos, Calif.

[21] Appl. No.: 566,877

[22] Filed: Dec. 4, 1995

[51] Int. Cl.⁶ .................. G06F 9/06; G06F 9/445
[52] U.S. Cl. ........................... 395/712; 395/652
[58] Field of Search ...................... 395/652, 712

[56] References Cited

U.S. PATENT DOCUMENTS

| | | | |
|---|---|---|---|
| 5,321,840 | 6/1994 | Ahlin et al. | 395/712 |
| 5,325,529 | 6/1994 | Brown et al. | 395/657 |
| 5,408,624 | 4/1995 | Raasch et al. | 395/712 |
| 5,408,664 | 4/1995 | Zarrin et al. | 395/652 |
| 5,410,707 | 4/1995 | Bell | 395/652 |
| 5,444,861 | 8/1995 | Adamec et al. | 395/712 |
| 5,471,674 | 11/1995 | Stewart et al. | 395/652 |
| 5,522,076 | 5/1996 | Dewa et al. | 395/652 |

Primary Examiner—Kevin A. Kriess
Assistant Examiner—John O. Chavis
Attorney, Agent, or Firm—Townsend and Townsend and Crew LLP; Kenneth R. Allen

[57] ABSTRACT

In a computer-driven device, a start-up mode after reset is provided whereby boot-up instructions are by default always accepted directly from an external source. The device may comprise a gate array (GA) which is connected directly via a serial port to a receiving or input device, to receive program code for transfer directly as instructions to a microprocessor-type central processing unit. The central processing unit is part of a computer controlled device containing a microprocessor, memory (a RAM), and typically a bulk erase flash memory device, the flash memory device being unprogrammed when the computer controlled device is fabricated originally. When the computer controlled device first powers up, a special mode of operation ensues in which the gate array directly monitor bits received via the serial port from the input device and shifts them into a local register from which bytes or words are loaded directly into the CPU as instructions. A boot sequence is thereby accepted in this manner to load random access memory of the free-running CPU which thereafter can control transfer of additional executable code or load a permanent boot sequence into bulk erase (nonvolatile) flash memory. The invention can be incorporated into a wireless modem/packet terminal node controller. The input device may be a coupling to an external computer system, typically a serial input.

9 Claims, 3 Drawing Sheets

METHOD FOR AUTONOMOUSLY TRANSFERRING CODE TO A COMPUTER WITHOUT ACCESSING LOCAL MEMORY BY THE CENTRAL PROCESSING UNIT

BACKGROUND OF THE INVENTION

This invention relates to techniques for starting computer systems and more particularly to a method for downloading executable code to a computer which is not provided with conventional boot code autonomous from the central processing unit.

All computing devices based on the model described by von Neumann require that a stored program be made available in memory for execution. Typically, such computing devices have a pre-loaded program (a "boot" program) in the form of executable instructions that contains sufficient logic to permit more extensive and higher-level programs to be loaded from external devices into the memory associated with the CPU. In early (pre-1975) computers, this boot program could be loaded manually directly through front panel switches connecting directly to registers to "stuff" the appropriate data and control bits to be transferring into a volatile memory associated with the CPU. However, modern computers lack a front panel, so this boot program is typically loaded into a pre-programmed read-only memory (ROM) device and automatically run upon application of power to the CPU. An example is the BIOS (Basic I/O System) Read Only Memory of an IBM-type PC.

In embedded computing devices, in which a microprocessor, ROM, and RAM are combined to perform a dedicated function, there typically is no external storage device, such as a disk drive. In these systems, either the stored program is typically unchangeable, in which case it is combined with the boot function onto ROM. In these systems, updating the stored program requires opening the device and changing a memory device, not an operation that a consumer would typically perform.

Alternatively, if a method is provided for a consumer to download a new stored program into the device, that typically requires that a boot program be resident inside the device and protected from consumer intervention.

The recent development of Flash EEPROM (Electrically Erasable Programmable Read-Only Memory) has made it possible to provide this function (namely, consumer download of new stored programs, typically an updated version) economically. Flash memory devices come in at least two forms—bulk erase, and boot-block. Bulk erase flash devices must be erased in toto. In order for a device using a bulk erase flash memory device to permit the consumer to update its stored program, the device must first erase its entire stored program, and then re-program it. If the process is interrupted after erasure but prior to enough of the stored program to be programmed (typically an interval of many seconds), the device is rendered inoperable. Furthermore, because the boot program has been erased, the device cannot be reloaded. Boot block flash memory devices have been devised to address this problem. In these devices, a portion of the memory is separately erasable, permitting a boot program to be stored there.

Unfortunately, boot block flash memory devices are expensive. In addition, they require that the memory device be pre-programmed prior to fabrication, which adds manufacturing cost to the device.

Alternatively, a separate memory device is required, which also adds manufacturing cost. What is needed is a scheme to permit code to be downloaded to a bulk erase flash memory device without requiring that the device be pre-programmed.

SUMMARY OF THE INVENTION

According to the invention, in a computer-driven device, a start-up mode after reset is provided whereby boot-up instructions are by default always accepted directly from an external source. The device may comprise a gate array (GA) which is connected directly via a serial port to a receiving or input device, to receive program code for transfer directly as instructions to a microprocessor-type central processing unit. The central processing unit is part of a computer controlled device containing a microprocessor, memory (a RAM), and typically a bulk erase flash memory device, the flash memory device being unprogrammed when the computer controlled device is fabricated originally. When the computer controlled device first powers up, a special mode of operation ensues in which the gate array directly monitor bits received via the serial port from the input device and shifts them into a local register from which bytes or words are loaded directly into the CPU as instructions. A boot sequence is thereby accepted in this manner to load random access memory of the free-running CPU which thereafter can control transfer of additional executable code or load a permanent boot sequence into bulk erase (nonvolatile) flash memory. The invention can be incorporated into a wireless modem/packet terminal node controller. The input device may be a coupling to an external computer system, typically a serial input.

The invention will be better understood by reference to the following detailed description in connection with the accompanying drawings.

DESCRIPTION OF SPECIFIC EMBODIMENTS

Figure 1:
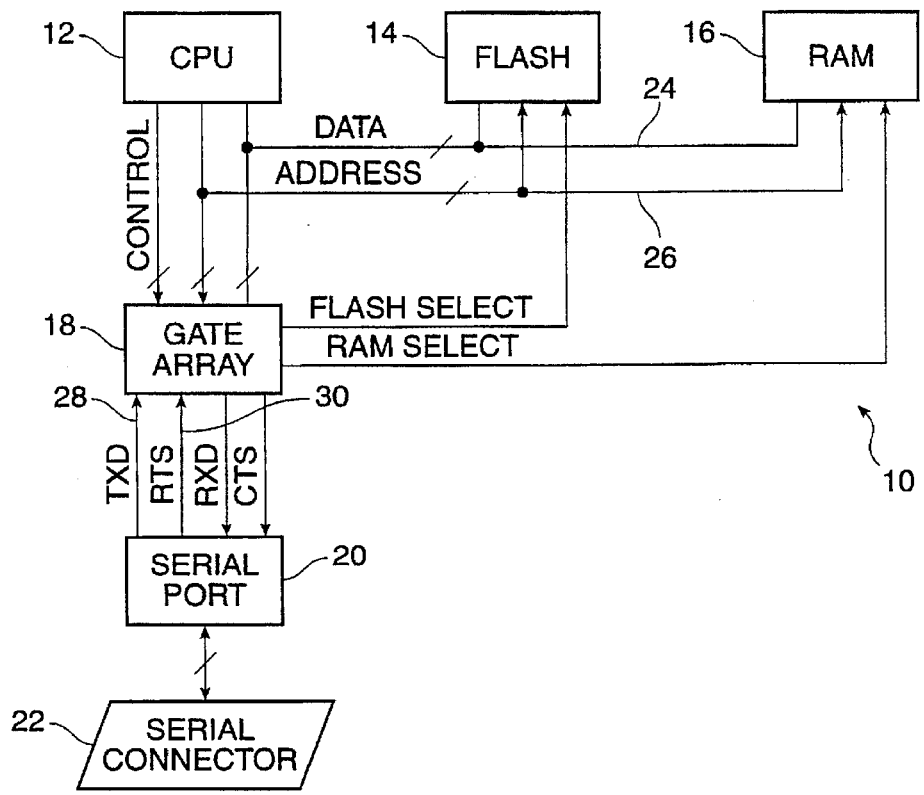
FIG. 1 is a block diagram of the system having a CPU, flash memory, RAM, gate array, serial port and receiving device, according to the invention.

Referring to FIG. 1, there is shown a block diagram of a computer-based system 10 (such as a terminal node controller) according to the invention having a CPU 12, flash memory 14, RAM 16, gate array 18, serial port 20 and receiving device 22. The CPU 12, flash memory 14, RAM 16, and gate array 18 are connected to a data bus 24 and an address bus 26. The gate array is coupled to the serial port 20 which in turn is coupled to receiving device 22. The receiving device is for example a serial connector. The gate array 18 has data i/o, address input and control input to/from the CPU 12, and a serial input line 28 and a control line 30. (The gate array may also provide a serial output path; however, that signal path is not pertinent to the present invention.)

Figure 2A:
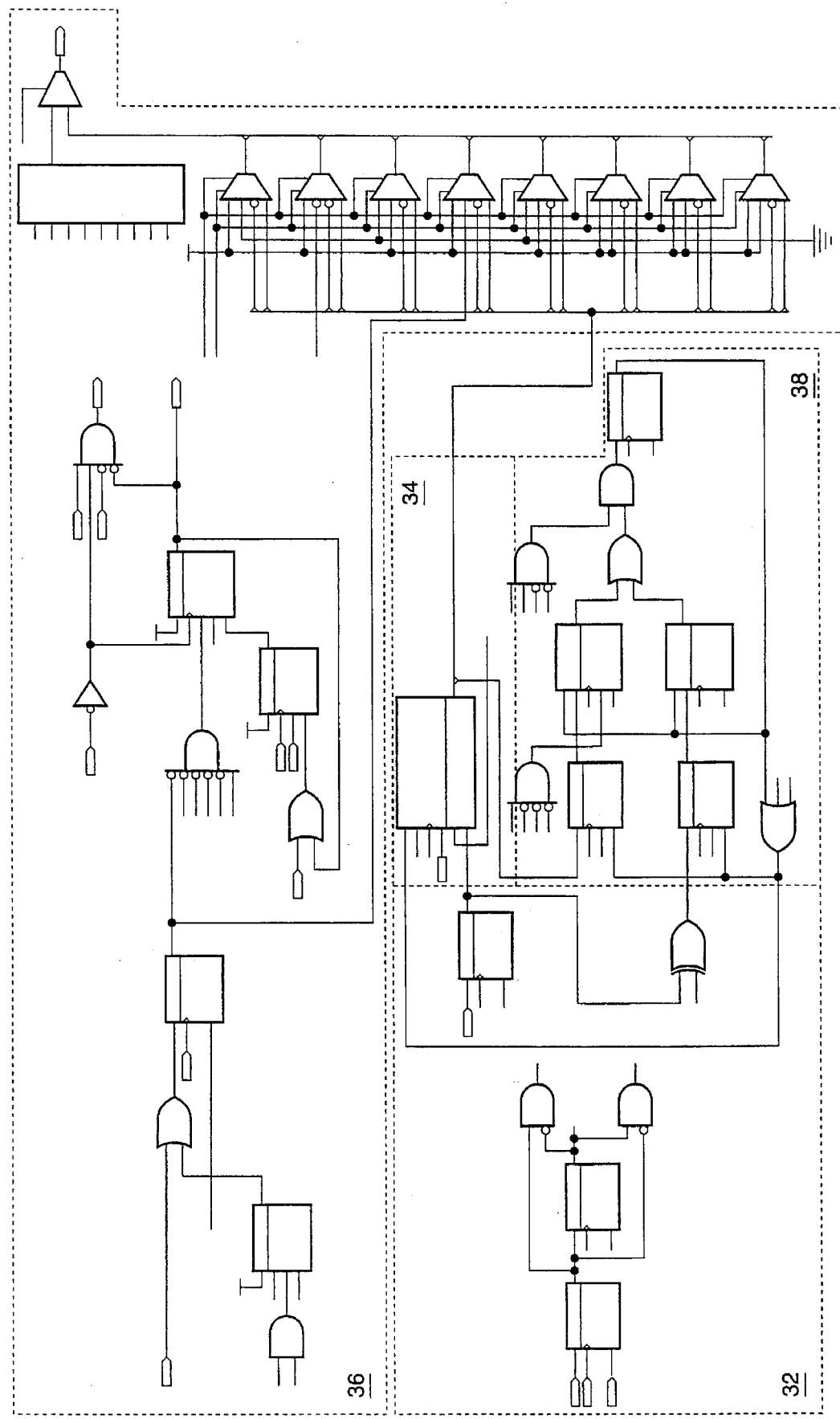
FIG. 2A is a schematic of a first version of circuitry inside the gate array which, in conjunction with the data being shifted in forms the boot loader.

Referring to FIG. 2A, there is shown a schematic diagram of a first version of the gate array 18. There is a serial I/O section 32, a receiving register section 34, and a CPU instruction control section 36. In this version, timing circuitry 38 is provided to automatically terminate the default boot sequence in the event no valid request for instruction is received.

Figure 2B:
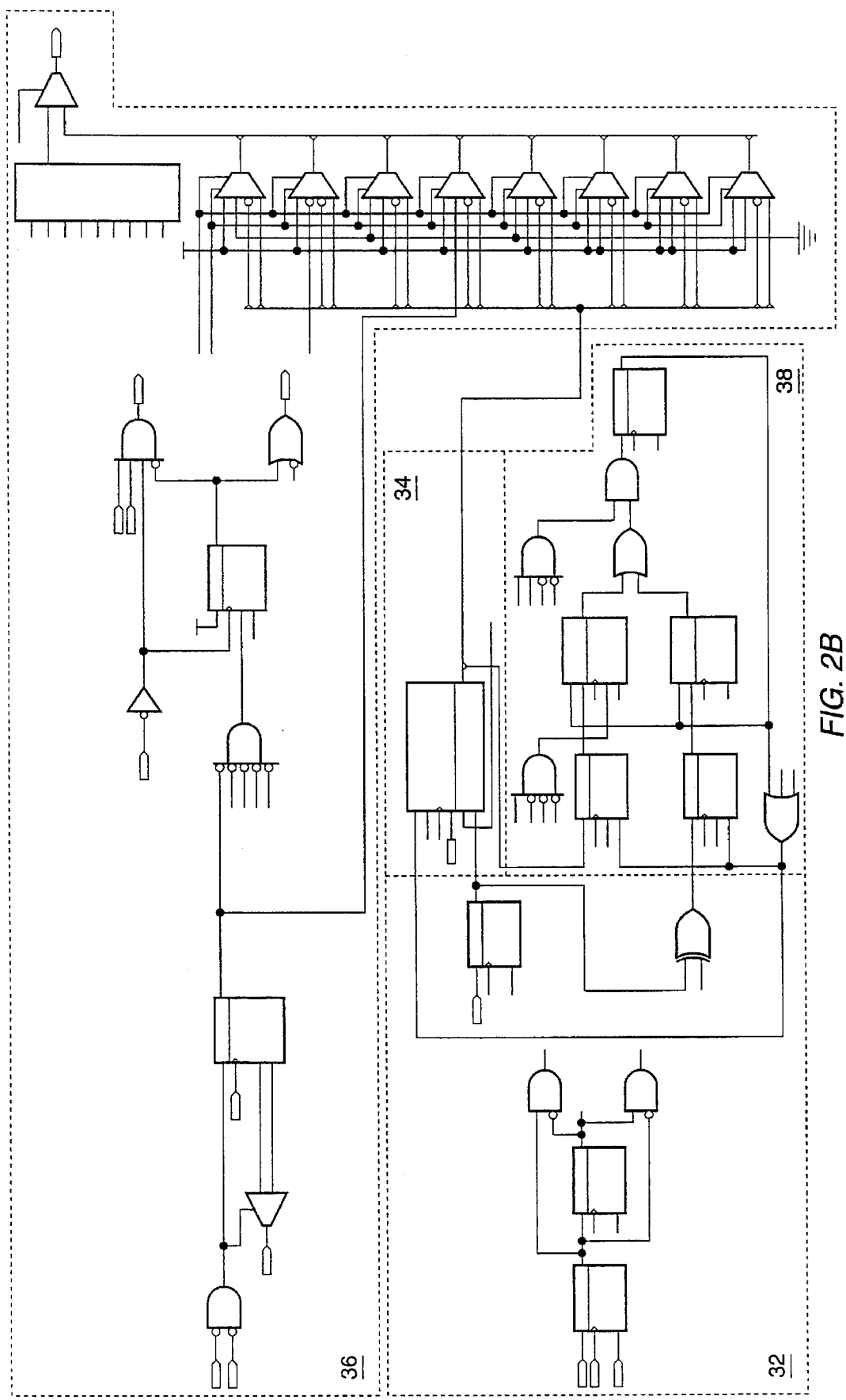
FIG. 2B is a schematic of a second version of circuitry inside the gate array which, in conjunction with the data being shifted in, forms the boot loader.

Referring to FIG. 2B, there is shown a schematic diagram of a second version of the gate array 18. There is a serial I/O section 132, a receiving register section 134, and a CPU instruction control section 136. In this version, no timing circuitry is provided to automatically terminate the default boot sequence in the event no valid request for instruction is received. An external "push" signal 138 is provided which must be present to activate and maintain the boot sequence.

Figure 3:
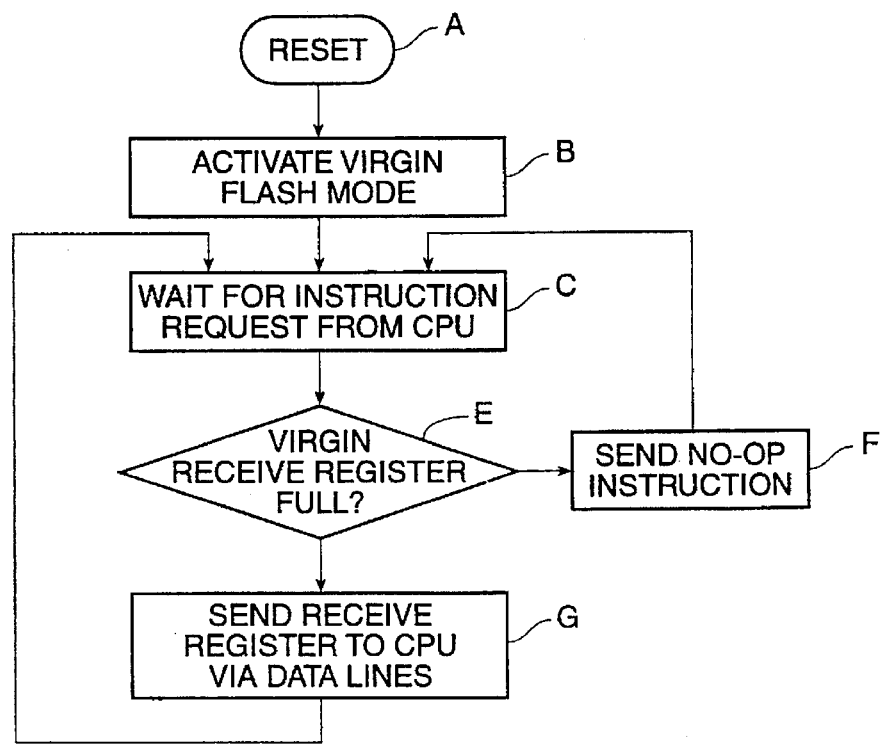
FIG. 3 is a flowchart illustrating the sequence of operations according to the invention.

Referring to FIG. 3, there is shown a flow chart of the boot method according the invention. Upon reset or power up (Step A), the "virgin flash" mode is initiated (Step B) and the gate array looks for instruction requests from the CPU 12 (Step C). (In the preferred embodiment of FIG. 2A, the gate array waits for about 16 ms to determine if a valid instruction request is received. In the alternative embodiment of FIG. 2B, the "push" signal 138 must remain asserted throughout the "virgin flash" mode. These alternative functions control the exit mechanism.)

The receiving register section 134, the so-called virgin receive register, routinely accepts serial data each cycle from the serial port 20. Each cycle the register is checked to see if it is full (Step E). If not, a filler instructions, such as a No-op, a jump-to-self instruction or equivalent instruction, is returned to the CPU (Step F). If it is full, the content of the virgin register is sent to the CPU as an instruction (Step G) and the register is cleared for receipt of the next stream of bits to form instructions. (A "one" bit is sent via the serial port as a start bit for the beginning of each instruction bit stream.)

The invention allows a CPU to execute instructions directly from external sources totally bypassing local memory. It is noteworthy that the instructions are executed one at a time as received, not waiting for an accumulation of a series of instructions, as in the case of conventional front-panel loading of boot instructions. This invention could even be used in applications of computer systems which have no RAM.

The invention could also be used in connection with a parallel input port by appropriate choice of an input register to receive and output data in parallel, e.g., a dual-port parallel register. What is important is a start-up mode after reset which is the acceptance of instructions directly from an external source. The invention can be used in a number of applications, such as loading BIOS's into PC's; updating code in PDA's.

The invention has now been explained with reference to specific embodiments. Other embodiments will be apparent to those of skill in the art. It is therefore not intended that this invention be limited, except as indicated by the appended claims.

What is claimed is:

1. A method for downloading a boot sequence to a computing device having an input element, a gate array, and a CPU, said method in said gate array comprising the steps of:
    upon reset looking for instruction requests from the CPU;
    accepting at a receiving register digital data from said input element;
    checking said register each cycle to determine if said register contains an instruction;
    returning a filler instruction to the CPU until said register contains a desired instruction; and thereupon
    transferring content of said register to the CPU as said desired instruction.

2. The method according to claim 1 wherein said input element is a serial input device and wherein said register is a shift register.

3. The method according to claim 1 wherein said register is cleared upon said transferring step for receipt of the next bits to form instructions.

4. The method according to claim 3 wherein a "one" bit is sent via the serial port as a start bit for the beginning of each instruction bit stream.

5. The method according to claim 1 wherein said input element performs parallel data input.

6. The method according to claim 1 wherein a timeout is used to exit from a default state of receiving instructions from an external source.

7. An apparatus for downloading a boot sequence to a computing device, said apparatus comprising:
    an input element for receiving digital data from an external source;
    a receiving register means coupled to receive said digital data from said input element;
    means for checking said register each cycle to determine is said register contains a desired instruction; and
    means for repetitively transferring each said valid instruction to said CPU.

8. The apparatus according to claim 7 wherein said input element is a serial input device.

9. The apparatus according to claim 7 wherein said input element is a parallel input device.

* * * * *